United States Patent
Kasche

(10) Patent No.: US 7,028,411 B1
(45) Date of Patent: Apr. 18, 2006

(54) LEVEL AND CHALK LINE MARKER

(76) Inventor: Mark Kasche, 1951 Pine St., Martinez, CA (US) 94553

( * ) Notice: Subject to any disclaimer, the term of this patent is extended or adjusted under 35 U.S.C. 154(b) by 0 days.

(21) Appl. No.: 10/968,667

(22) Filed: Oct. 19, 2004

(51) Int. Cl.
 *B44D 3/38* (2006.01)
 *G01C 9/24* (2006.01)

(52) U.S. Cl. .......................... 33/451; 33/414
(58) Field of Classification Search .............. 33/451, 33/333, 334, 413, 414
 See application file for complete search history.

(56) References Cited

U.S. PATENT DOCUMENTS

| | | |
|---|---|---|
| 577,708 A | 2/1897 | Barrie |
| 4,143,462 A * | 3/1979 | Gertz ........................ 33/414 |
| 4,189,844 A | 2/1980 | Riggins, Sr. |
| 4,438,538 A | 3/1984 | Larsen |
| 4,551,922 A | 11/1985 | Someya |
| 4,921,507 A * | 5/1990 | Beyer ........................ 33/413 |
| 5,022,158 A * | 6/1991 | Beyer ........................ 33/413 |
| 5,119,565 A | 6/1992 | Horvath et al. |
| 5,699,622 A * | 12/1997 | Umbro ...................... 33/414 |
| 6,345,448 B1 | 2/2002 | Chontos |
| 6,640,456 B1 | 11/2003 | Owoc et al. |
| 6,678,961 B1 | 1/2004 | Panahi |
| D488,729 S | 4/2004 | Golaszewski et al. |
| 6,826,845 B1 * | 12/2004 | Pritchard ................... 33/414 |
| 2004/0211074 A1 * | 10/2004 | Tessel et al. ............... 33/414 |

* cited by examiner

*Primary Examiner*—Christopher W. Fulton
(74) *Attorney, Agent, or Firm*—Thomas R. Lampe

(57) ABSTRACT

A chalk line marker is releasably connectable to a level. When connected to the level, the chalk line marker is employed to provide chalk marks in orientations established by the level. When the chalk line marker is removed from the level, the level and chalk line marker can be used independently in conventional fashion.

8 Claims, 3 Drawing Sheets

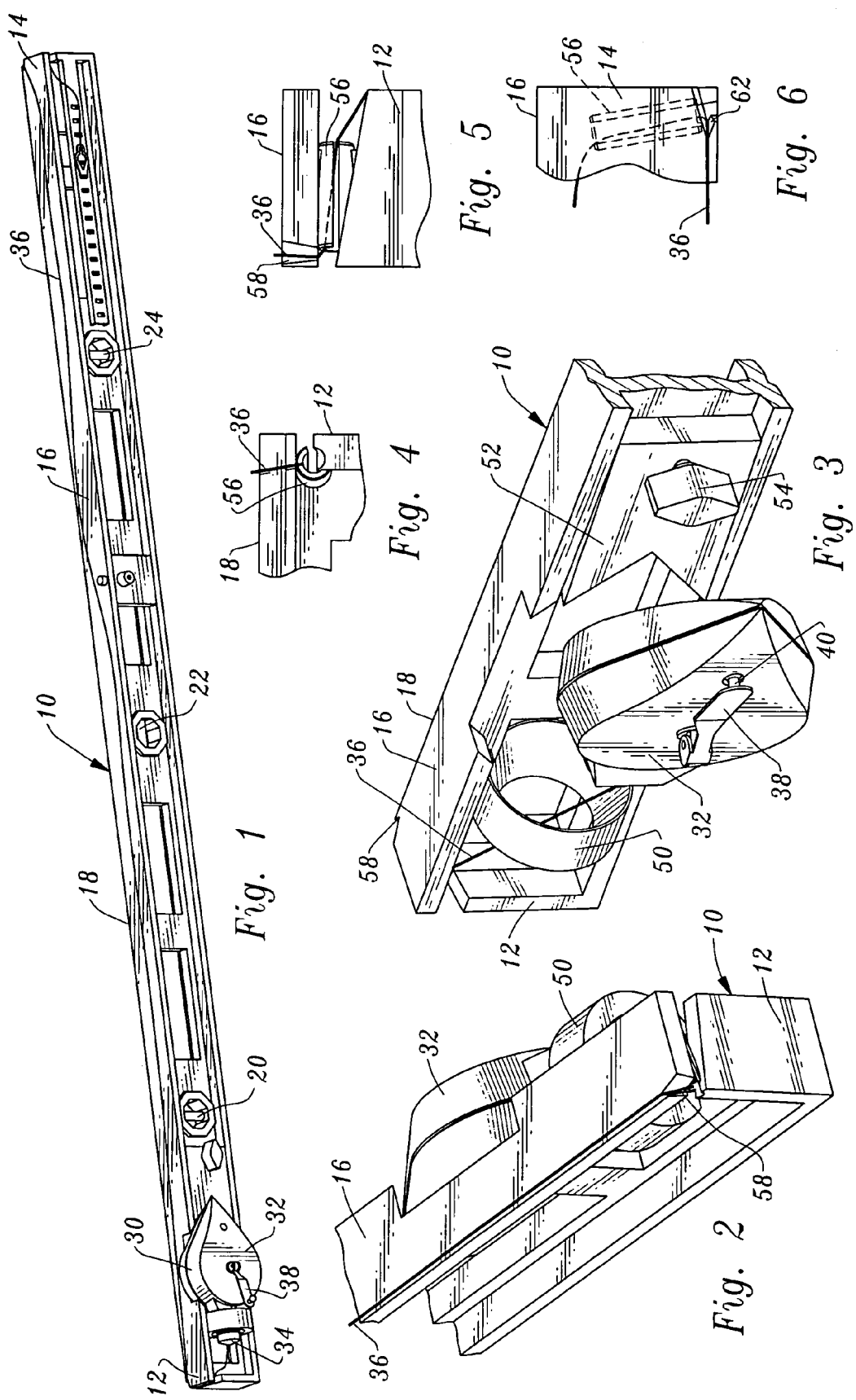

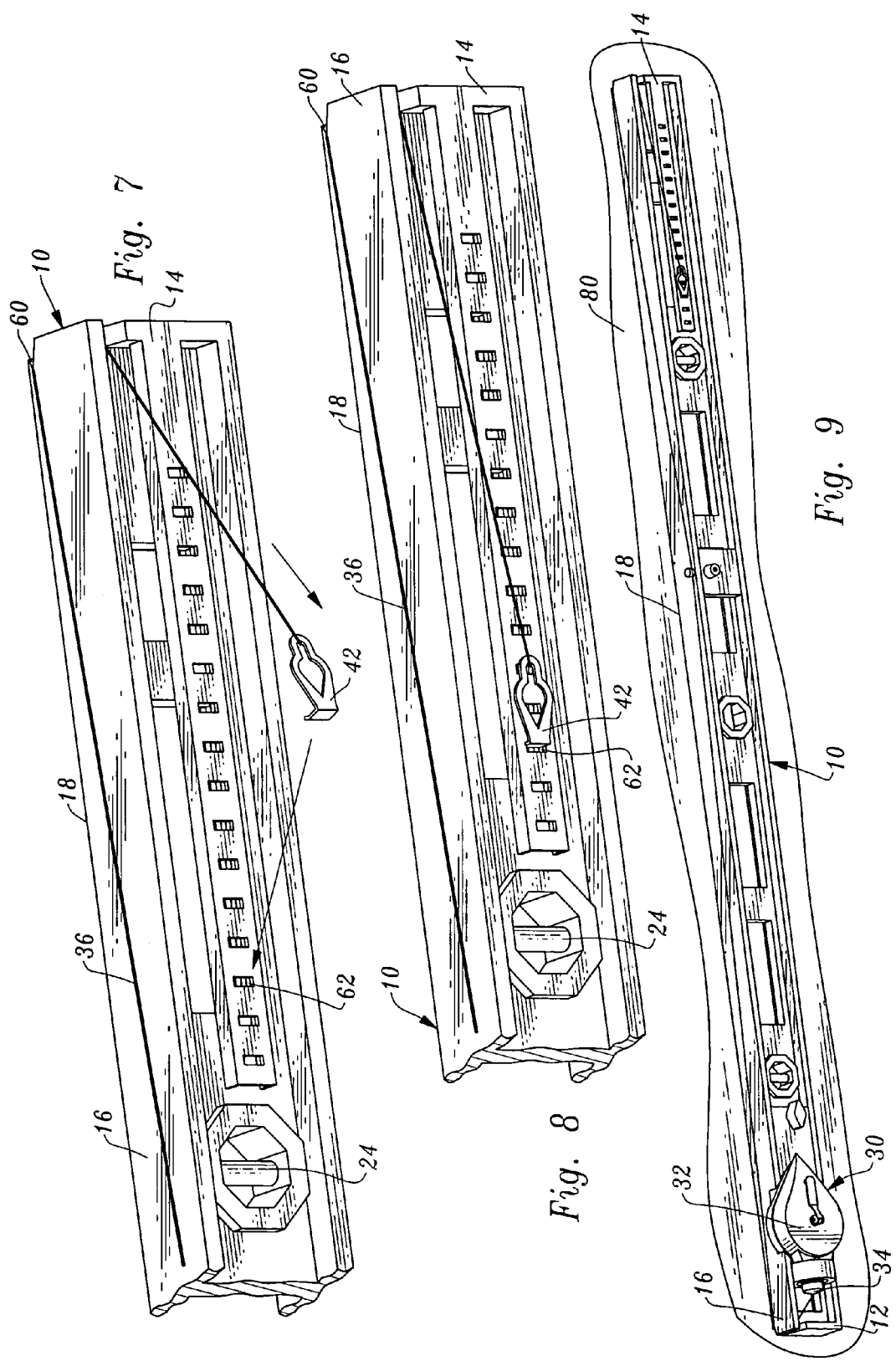

LEVEL AND CHALK LINE MARKER

TECHNICAL FIELD

This invention relates to a structural combination including a level and a chalk line marker. The level and the chalk line marker are selectively either releasably connected for joint use or completely separable from one another whereby the level and chalk line marker may be employed independently in conventional fashion.

BACKGROUND ART

It is known to incorporate chalk line markers along with other devices in a tool of single unitary structure. Some of these tools incorporate level systems which are utilized to guide placement of the chalk line for marking purposes.

The following United States patents disclose tools which are believed to be representative of the current state of the art in this field: U.S. Pat. No. 577,708, issued Feb. 23, 1897, U.S. Pat. No. 6,640,456, issued Nov. 4, 2003, U.S. Pat. No. 6,678,961, issued Jan. 20, 2004, U.S. Pat. No. 6,345,448, issued Feb. 12, 2002, U.S. Pat. No. 4,189,844, issued Feb. 26, 1980, U.S. Pat. No. 4,438,538, issued Mar. 27, 1984, U.S. Pat. No. 4,551,922, issued Nov. 12, 1985, U.S. Pat. No. 5,119,565, issued Jun. 9, 1992, and U.S. Design Patent No. D488,729, issued Apr. 20, 2004.

A disadvantage of all of the arrangements indicated above incorporating chalk line markers with levels and other devices is that they do not allow for ready separation of the chalk line markers so that they can be employed independently from the levels or other devices with which they are associated. In some situations, it is undesirable or impractical to maneuver and employ such combination tools with respect to a chalk line marker, for example, the unwieldy and bulky nature of such devices can be a hindrance to proper use. Likewise, the chalk line marker can be a hindrance to the use of a level in normal fashion.

DISCLOSURE OF INVENTION

The present invention relates to a structural combination including an elongated level having first and second ends and an outer surface extending between the first and second ends terminating at an edge.

The invention also incorporates a chalk line marker including a housing having a housing interior and defining a chalk line opening communicating with the housing interior. The chalk line marker also includes chalk line within the housing projecting outwardly from the housing interior through the chalk line opening and selectively movable between an extended position and a retracted position. The chalk line has a distal end with a retainer clip.

The invention also incorporates connector structure releasably connecting the chalk line marker to the level whereby the chalk line marker may be selectively employed with the level to provide chalk marks in orientations corresponding to orientations of said edge or alternatively completely removed from and employed independently of the level to provide chalk marks. Upon removal of the chalk line marker from the level the level may be employed independently of the chalk line marker.

Other features, advantages and objects of the present invention will become apparent with reference to the following description and accompanying drawings.

BRIEF DESCRIPTION OF DRAWINGS

FIG. 1 is a frontal, perspective view of a structural combination constructed in accordance with the teachings of the present invention, including a chalk line marker releasably connected to a level;

FIG. 2 is an enlarged, perspective view of the back of a portion of the structural combination and showing chalk string from the chalk string marker proceeding from an end of the level along an upper edge thereof;

FIG. 3 is a frontal, perspective view of the chalk line marker and an end portion of the level, the chalk line marker being disconnected from the end portion;

FIG. 4 is a greatly enlarged, rear view of a portion of the end of the level which accommodates the chalk line marker and illustrating details of guide structure employed to properly position the chalk string;

FIG. 5 is an enlarged, end elevational view of the guide structure shown in FIG. 4;

FIG. 6 is a greatly enlarged, front, elevational view of a portion of the end of the level remote from the chalk line marker and showing details of the chalk string guide structure at that remote end;

FIG. 7 is a frontal, perspective view of a portion of the level at the end portion thereof remote from the chalk line marker and showing a retainer clip at the distal end of the chalk line prior to its connection to the level;

FIG. 8 is a view similar to FIG. 7, but illustrating the retainer clip attached to the level;

FIG. 9 is a perspective view showing the level adjacent to a wall surface with the chalk string offset from the edge and taut so that the string is biased toward the edge and wall surface;

BEST MODE FOR CARRYING OUT THE INVENTION

Figure 12:
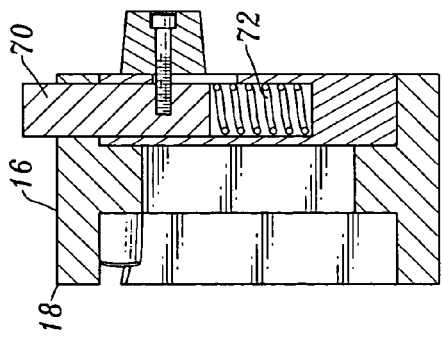
FIG. 12 is a greatly enlarged, cross-sectional view taken along the line 12—12 of FIG. 10.

Referring now to the drawings, apparatus constructed in accordance with the teachings of the present invention includes an elongated level 10 having ends 12, 14 and a straight, flat outer surface 16 having a straight edge 18 extending between the ends 12, 14. The level, as is conventional, includes level bubble tubes 20, 22, 24.

The structure of the present invention also includes a chalk line marker 30 which is of conventional construction. The chalk line marker includes a housing 32 having a housing interior (not shown) and defining a conventional chalk line opening located at an end 34 of the housing communicating with the housing interior. Chalk line 36 of conventional character is disposed within the housing interior and projects outwardly through the chalk line opening.

The chalk line is selectively movable between an extended position shown in FIG. 1, for example, and a retracted position wherein all but the distal end of the chalk line is disposed within the housing interior. As is also conventional, the chalk line marker illustrated has an inner reel (not shown) which is rotated by a reel handle 38 to wind the string. A detent arrangement 40 may be employed to lock the winding handle and reel against rotational movement, once again a conventional feature. A retainer clip 42 is attached to the distal end of chalk line 36.

Connector structure releasably connects the chalk line marker to the level whereby the chalk line marker may be selectively employed with the level to provide chalk marks in orientations corresponding to orientations of edge 18 or alternatively completely removed therefrom and employed independently of the level to provide chalk marks. When the chalk line marker is removed from the level the level is employable independently of the chalk line marker. FIG. 3 shows the chalk line marker 30 removed from the level, except for a portion of the chalk line 36 which itself will of course be disengaged from the level whenever the chalk line marker is to be used independently.

The connector structure is located closely adjacent to or at the end 12 of the level. In the arrangement illustrated, the chalk line marker is not positioned at the extreme end, however it could be.

The connector structure includes a receptacle 50 in the form of an open ended cylinder which receives the string exit end of the chalk line marker housing. Once this has been accomplished, the housing 32 is locked in place in the receptacle 50. In the arrangement illustrated, this is accomplished by a lock member 52 connected to the level by a threaded fastener 54. The end of the member 52 spaced from fastener 54 has a V-shaped cut formed therein which facilitates placement of the right end of the housing (as viewed in FIG. 3) behind the lock member when the threaded fastener 54 is loosened. A portion of the housing 32 is disposed behind the lock member 52 and the threaded fastener 54 is turned to clamp the housing in position. It will be appreciated that other types of releasable connectors may be employed without departing from the spirit or scope of the present invention.

After the housing has been installed in place and one wishes to utilize the chalk line marker, the chalk line 36 is manually pulled from the housing and positioned in a guide tube 56 located at end 12 through a slot in the guide tube. As perhaps may best be seen with reference to FIGS. 4 and 5, the chalk line 36 is then drawn upwardly and positioned in a guide notch 58 located immediately adjacent to edge 18.

The chalk line is then drawn the whole length of the level closely adjacent to surface 16 and edge 18 and positioned in a guide notch 60 located at end 14 of the level. From notch 60 the chalk line is directed downwardly through a tubular-shaped guide 56 and thence rearwardly, as shown in FIG. 6. A notch 62 is employed to stabilize and position the chalk string.

After the steps just described, the retainer clip 42 is employed to attach the distal end of the chalk string to the level. FIG. 7 shows retainer 42 just prior to engagement with one selected opening 62 of a plurality thereof formed in the level. If the chalk marker reel has been locked at this time, the chalk line can be pulled to the desired degree of tautness by manual positioning of the retainer clip. Of course, tightening could occur at the other end by retracting line through manual use of the chalk marker reel if desired. This tightening of the chalk line will place the chalk line at outer surface 16 and along the edge 18.

Figure 11:
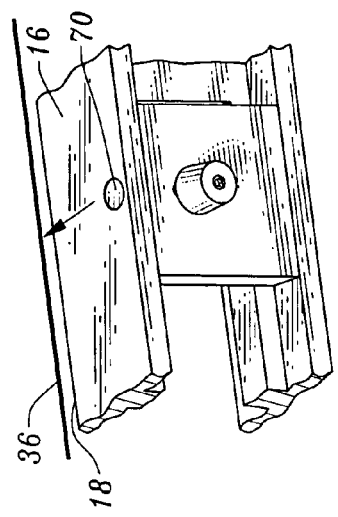
FIG. 11 is a view similar to FIG. 10, but illustrating the chalk string released from the movable chalk string contact member to form a chalk mark.
Figure 10:
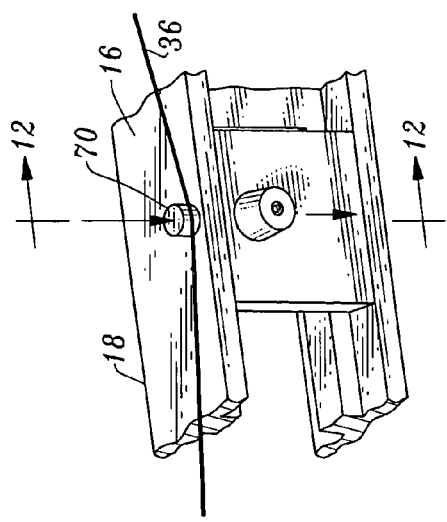
FIG. 10 is an enlarged, detail perspective view showing the chalk string being maintained in taut condition by a movable chalk string contact member.
Figure 13:
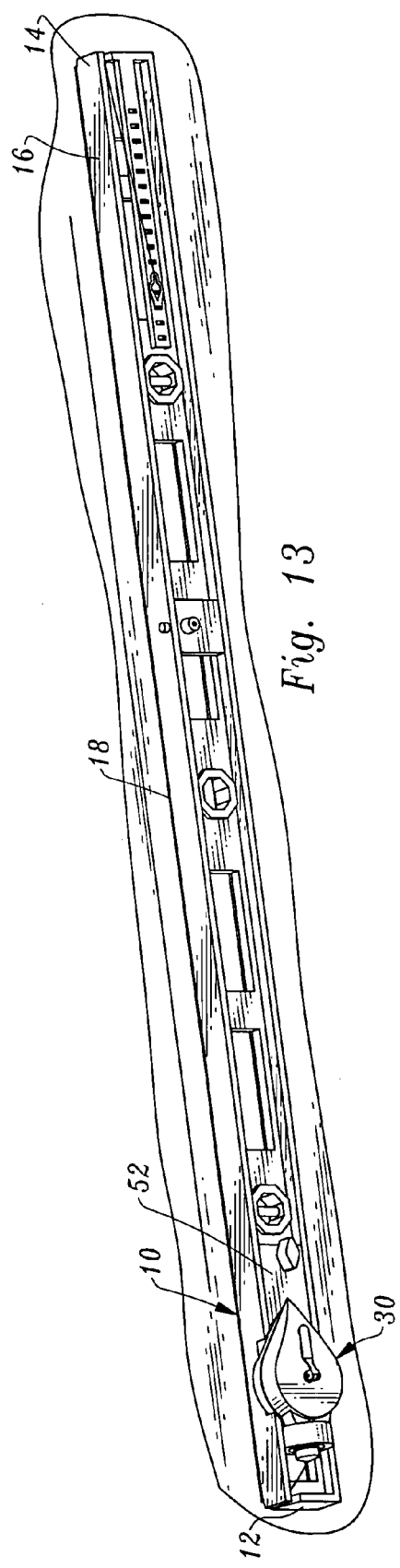
FIG. 13 is a view similar to FIG. 9, but illustrating the level and chalk line marker being removed from the wall after a chalk mark has been made.

Referring now to FIGS. 10, 11 and 12, a movable chalk line contact member or detent 70 extends outwardly from outer surface 16 of the level closely adjacent to the edge of the upper surface in opposition to edge 18. A spring 72 continuously biases the detent to its extended position as shown in FIGS. 10 and 12.

When one wishes to utilize the combined level and chalk line marker to make a chalk mark, the chalk line 36 is brought over detent 70 and placed behind it. This maintains the chalk line displaced away from edge 18 in a taut condition and biased for movement toward edge 18. The level is placed against a surface to be marked, such as wall surface 80 shown in FIG. 9. When the level is positioned as desired, operating button 82 associated with detent 70 is pushed downwardly. This of course also causes the detent to move down, and the chalk line 36 snaps toward its normal position and moves in the direction of edge 18 and beyond to wall 80 to make the chalk mark.

As previously indicated, once the use of the combined level and chalk marker is no longer desired, the chalk marker is removed from the level and they can function independently in a conventional manner.

The invention claimed is:

1. In combination:
   an elongated level having first and second ends and ae an outer surface extending between said first and second ends terminating at an edge;
   a chalk line marker including a housing having a housing interior containing chalk and defining a chalk line opening communicating with said housing interior and a chalk line wound within said housing projecting outwardly from said housing interior through said chalk line opening and selectively movable upon unwinding and winding thereof, respectively, between an extended position and a retracted position, said chalk line having one chalk line end disposed within said housing interior at all times and the other chalk line end comprising a distal end with a retainer clip disposed outside said housing interior; and
   connector structure releasably connecting said chalk line marker to said level whereby said chalk line marker may be selectively employed with said level to provide chalk marks with the chalk line thereof in orientations corresponding to orientations of said edge or alternatively completely removed in its entirety from said level to provide chalk marks with the chalk line thereof in a conventional manner independently of said level, and said level being employable independently of said chalk line marker upon removal of said chalk line marker.

2. The combination according to claim 1, wherein said connector structure is located at or closely adjacent to the first end of said level.

3. The combination according to claim 2 wherein said connector structure includes a receptacle releasably receiving said housing.

4. The combination according to claim 3 wherein said connector structure additionally includes a lock engageable with said housing when said housing is received by said receptacle to prevent removal of said housing from said receptacle.

5. The combination according to claim 2 wherein said chalk line when in said extended position extends substantially the full length of said level adjacent to said surface from said first end of the level to said second end of the level.

6. The combination according to claim 5 wherein said level additionally includes retainer clip engagement structure at or adjacent to said second end of the level for releasably connecting said retainer clip to said level when said chalk line is in said extended position.

7. The combination according to claim 6 additionally comprising guide structure on said level for engagement by said chalk line between said connector structure and said retainer clip engagement structure when said chalk line is in its extended position to maintain a substantial portion of said chalk line extending along and closely adjacent to said outer surface.

8. In combination:
- an elongated level having first and second ends and an outer surface extending between said first and second ends terminating at an edge;
- a chalk line marker including a housing having a housing interior and defining a chalk line opening communicating with said housing interior and chalk line within said housing projecting outwardly from said housing interior through said chalk line opening and selectively movable between an extended position and a retracted position, said chalk line having a distal end with a retainer clip;
- connector structure releasably connecting said chalk line marker to said level whereby said chalk line marker may be selectively employed with said level to provide chalk marks in orientations corresponding to orientations of said edge or alternatively completely removed from said level to provide chalk marks, and said level being employable independently of said chalk line marker upon removal of said chalk line marker, said connector structure located at or closely adjacent to the first end of said level, said chalk line when in said extended position extending substantially the full length of said level adjacent to said surface from said first end to said second end; and
- a movable chalk line contact member on said level for engagement by said chalk line when said chalk line is in said extended position and adjacent to said outer surface, said chalk line contact member movable between first and second positions, said chalk line contact member when in said first position operable to maintain said chalk line displaced away from said edge in a taut condition and biased for movement toward said edge and when in said second position operable to disengage from said chalk line whereby said chalk line will move in the direction of said edge and beyond said edge to provide a chalk mark on a structure adjacent to said level.

* * * * *